United States Patent [19]

Aneja et al.

[11] E - Re. 28,903

[45] Reissued July 13, 1976

[54] PHOSPHATIDE SEPARATION

[75] Inventors: Rajindra Aneja, Welwyn Garden City; Jaswinder Singh Chadha, London, both of England

[73] Assignee: Lever Brothers Company, New York, N.Y.

[22] Filed: Nov. 25, 1974

[21] Appl. No.: 526,764

Related U.S. Patent Documents

Reissue of:

[64] Patent No.: 3,752,833
Issued: Aug. 14, 1973
Appl. No.: 175,731
Filed: Aug. 27, 1971

[30] Foreign Application Priority Data

Sept. 23, 1970 United Kingdom ..... 45295/70

[52] U.S. Cl. ..... 260/403; 426/604

[51] Int. Cl.[2] ..... A23J 7/00; C07F 9/02

[58] Field of Search ..... 260/403

[56] References Cited

UNITED STATES PATENTS

| | | | |
|---|---|---|---|
| 2,422,321 | 6/1947 | Trueger et al. | 260/403 |
| 2,849,318 | 8/1958 | Julian et al. | 260/403 |
| 3,704,254 | 11/1972 | Aneja | 260/403 |

*Primary Examiner*—Patrick P. Garvin
*Attorney, Agent, or Firm*—Arnold Grant

[57] ABSTRACT

N-acylphosphatides, for instance N-acetylcephalin, are separated from phosphatides without an acylatabe amino group, for instance lecithin, by making a mixture containing them acid to the equivalent of pH less than 3.5 under aqueous conditions and solvent-fractionating with acetone or methyl acetate.

14 Claims, No Drawings

PHOSPHATIDE SEPARATION

Matter enclosed in heavy brackets [ ] appears in the original patent but forms no part of this reissue specification; matter printed in italics indicates the additions made by reissue.

This invention relates to a process for the separation of phosphatides from mixtures containing them.

Phosphatide mixtures are obtained as by-products in the production of vegetable oils and are used in the margarine industry for their emulsifying properties in water-in-oil emulsions. Such phosphatide mixtures consist of various phosphatides, and especially ethanolamine, serine, inositol and choline phosphatides, together with neutral triglyceride oil, free fatty acids, water and other accompanying substances, including small quantities of steroids. The amounts of triglyceride oil present in commericial phosphatides are often within the region of 30 to 40% by weight of the total material, and the products are viscous liquids. In commerce mixtures of these phosphatides are often referred to as lecithin, but this name is also used more specifically for the choline phosphatide itself, and it is in this latter sense that lecithin is used in this specification.

Ethanolamine and serine phosphatides have the structure.

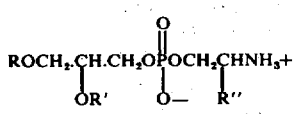

where R and R′ are long chain fatty acid radicals and R″ is hydrogen and hydroxycarbonyl respectively: these phosphatides are together known under the name cephalin. Inositol phosphatides have the structure

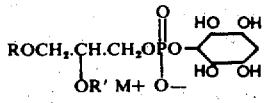

where R and R′ are long chain fatty acid radicals and M is a metal atom, for instance sodium, potassium, calcium or magnesium, and the inositol group may be substituted by glycoside and other radicals. A very active emulsifier component of the phosphatide mixtures is the choline phosphatide, lecithin, which has the structure

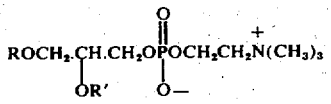

where R and R′ are long chain fatty acid radicals. All four phosphatides have an acid hydroxy group, shown above in salt form, but of the three nitrogenous phosphatides only lecithin has no free amino group.

Where cephalin and lecithin are present together in a phosphatide mixture, as in the by-products mentioned above, the cephalin has a deleterious effect on the emulsifying properties of the lecithin by some kind of antagonising action, for instance when used in margarine: other undesirable characteristics have also been attributed to cephalin; thus, parenterally administered fat emulsions prepared using phosphatides containing cephalin have a hypertensive action for which the cephalin present is responsible, and when phosphatide mixtures are hydrogenated cephalin present is commonly believed to have a deactivating effect on the catalyst. On the other hand no disadvantage attends the presence of inositol phosphatides.

Accordingly, methods have been sought for avoiding the deleterious effect of the cephalin. In one such process, described in British Pat. 1,174,399, vegetable phosphatide mixtures are modified by reacting the free amino group of the cepahlin present with an acylating agent. This forms acylcephalin which does not antagonise the emulsifying properties of lecithin, so that the phosphatide mixture, in which the acylcephalin remains present, has an improved emulsifying action.

Attempts have been made to separate cephalin from lecithin in phosphatide mixtures in order to obtain a phosphatide with a higher lecithin concentration having improved properties but this has proved a difficult problem. Solvent fractionation results in a partial separation, providing lecithin-enriched and cephalin-enriched fractions, and British Pat. 1,113,241 describes an enrichment process of this kind using an aqueous alcohol extraction by which the proportion of lecithin to cephalin is increased by from 1:1 to from 5:1 in the extract, but substantial proportions of lecithin remain in the residue.

British Pat. 1,217,846 describes one solution of the problem of separating cephalin from lecithin, where phosphatide mixtures containing them are acylated to convert the cephalin present into acylcephalin and the lecithin and acylcephalin are separated by solvent fractionation with acetone or methyl acetate in the presence of sufficient of an acetone-soluble or methyl acetate-soluble nitrogen base to provide basic conditions equivalent to a pH in water of at least 8.5. While this represents a marked advance it has the disadvantage that traces of nitrogen base remain in the separated phosphatides after removal of solvent, and such residues of nitrogen bases, which are generally undesirable where the product is to be used in foodstuffs, cannot be removed completely and with certainty without recourse to additional steps which raise the cost of the process.

The present invention is concerned with another method of separating N-acylphosphatides such as N-acylcephalins from non-N-acylatable phosphatides in which nitrogen bases are not employed, and no residues of them therefore remain.

It has now surprisingly been discovered that an acylcephalin can be readily separated from lecithin or inositol phosphatide in mixtures containing them by solvent fractionation with acetone or methyl acetate in the presence of sufficient of an acid to provide an acidity equivalent to a pH under aqueous conditions of less than 3.5. By acidity "equivalent to a pH under aqueous conditions" of a given value it is meant that the acidity of the composition is such at a 1% by weight dispersion of the composition in water has that pH value. These are conditions very different from those of British Pat. 1,217,846, and the mechanism of action of the process is not understood. The acylcephalin is extracted by the solvent, leaving the lecithin or inositol phosphatide behind. Unacylated cephalin cannot be separated from the other phosphatides under these conditions. The separation is also effective in the presence of large amounts of triglyceride oil such as are present in commerical phosphatides; triglycerides are removed with the cepahlin.

Accordingly, the present invention provides a process for separating an N-acylphosphatide and a phosphatide without an acylatable amino group from a mixture comprising them, which comprises adding to the mixture a sufficient amount of an acid to provide the equivalent of pH less than 3.5 under aqueous conditions, extracting the mixture with acetone or methyl acetate, and separating the phases containing the N-acylphosphatide and the phosphatide without an acylatable amino group.

In practice a phosphatide mixture that comprises N-acylatable and non-N-acylatable phosphatides is contacted with an acylating agent to convert the N-acylatable phosphatide to N-acylphosphatide, a sufficient amount of an acid to provide the equivalent of pH less than 3.5 under aqueous conditions is added, the mixture is extracted with acetone or methyl acetate, and the phases containing the N-acylphosphatide and the non-N-acylatable phosphatide are separated.

In practice the N-acylatable phosphatide is cephalin, and at least some lecithin is preferably present as non-acylatable phosphatide; for instance the phosphatide mixture can comprise cephalin, lecithin and inositol phosphatide. As phosphatide starting materials for the separation process there can be used commercial phosphatides, for instance the hydrated vegetable phosphatides obtained by treating with a small amount of water a phosphatide-containing crude oil extracted from plants, for example crude soyabean oil, so that the phosphatides become hydrated and are precipitated as a gum and are then separated. Egg yolk phosphatides can also be used. Preferably the phosphatide mixture contains from 0.1 to 20 parts of lecithin to each part by weight of cephalin. Such phosphatides and modifications of them that can be used are described in British Pat. 1,118,373. Lecithin-enriched or cephalin-enriched phosphatides obtained by solvent fractionation with aqueous alcohols as described in British Pat. 1,113,241 can be used. Vegetable phosphatide compositions containing up to 80%, for instance from 20 to 60%, by weight of triglyceride oil can be used. The acylated phosphatide mixtures obtained as described in British Pat. 1,174,399 can also be employed. Partially hydrogenated phosphatide mixtures can be used where the original fatty acyl groups included those of unsaturated fatty acids and some of these have been saturated by hydrogenation. The phosphatide starting materials can contain appreciable quantities of water even before the acylation step, for it has been found that the presence of water does not seriously interfere with N-acylation and helps to prevent O-acylation by excess acylating reagent which would give rise to phosphatides in which the hydroxy groups of inositol phosphatides present, as well as the hydroxy group attached to the phosphorus atoms, are acylated: acylation at the phosphorus atom causes no problem as the acyl group can be removed by after-treatment with water, but the acylation of inositol groups can represent an unnecessary loss of acylating agent, for inositol phosphatides can be present in large proportions: also, once acylated, the inositol hydroxy groups concerned cannot be re-formed because the conditions necessary for this would remove the acyl groups esterifying the glyceryl radical and thus destroy the phosphatides.

As acylating agent there is preferably used a carboxylic acid anhydride, especially a fatty acid anhydride, for example acetic, propionic, capric, oleic or stearic anhydrides, or mixed anhydrides such as those obtained from soyabean fatty acids by trans-anhydridisation with acetic anhydride: maleic, succinic, or phthalic anhydride can also be used. Other acylating agents, for instance acyl chlorides such as acetyl chloride, and ketene, can be used, but as they react more readily with water and with hydroxy groups of substances present in the starting materials, they are less efficient than anhydrides. The amount of acylating agent required is that necessary to acylate all the free amino groups present, with allowance for loss of reagent where water present competes by hydrolysis. As phosphatides rarely contain more than 30% by weight of cephalin, 4% of acetic anhydride by weight of phosphatide is usually satisfactory. Where the phosphatide starting material is highly viscous, reaction can be carried out in a suitable inert solvent medium, for instance in hexane, benzene, or chloroform, or even in acetone or methyl acetate where substantial amounts of triglyceride are present, but no solvent is generally necessary where the phosphatide mixture contains sufficient triglyceride oils to make it fluid. The mixture should be stirred during reaction, and this is especially desirable where no solvent is employed. The acylation can be conducted in an inert atmosphere, for instance under nitrogen.

As free acid derived from the acylating agent is progressively formed during the reaction where the acylating agent is an anhydride, and this free acid tends to inhibit completion of acylation by suppression of the reactive unprotonated amine form of the remaining N-acylatable phosphatide in favour of the unreactive protonated form it is preferable to promote completion of the acylation by removal from the reaction mixture of the free fatty acid formed. This can be done by physical means, for instance, distillation: thus the acid can be distilled off either as an azeotrope, for instance that with carbon tetrachloride which distills at 76.5° C. and contains 3% acetic acid, or simply by evaporation under reduced pressure. If any anhydride needed for acylation is removed at the same time, it can be replaced. Particularly suitable where acetic anhydride is used as acylating agent is reaction of a suitable excess, for instance 33%, at 80° C. under a reduced pressure of 25 mm. of mercury maintained with a solid potassium hydroxide trap. In this way a reaction product forms in which more than 95% of the cephalin originally present has been converted to acylcephalin. A typical product of acylation, after removal of acetic acid by such evaporation, gives a 1% aqueous dispersion of pH 6.3.

The progress of the acylation reaction can be followed by thin layer chromatography on silica gel plates with as mobile phase a mixture of chloroform, methanol and water in proportions of 65:25:4 by volume, and treatment of the developed chromatogram with ninhydrin reagent. Reaction is complete when the pink spot of $R_f$ about 0.6 due to free primary amino compound is no longer visible. Preliminary tests can be carried out using this technique to determine the amount of acylating agent and other conditions most appropriate for use in acylating any particular phosphatide mixture, for instance a mixture of unknown N-acylatable phosphatide content.

After acylation the excess acylating agent can be neutralised, or where the acylating agent is volatile, it also can be evaporated off, for instance under reduced pressure. Any solvent which would interfere with the subsequent fractionation can also be removed by evaporation.

In the solvent fractionation step, which will normally consist of extracting with the solvent and separating the phases containing the N-acylphosphatide without an acylatable amino group, acetone or methyl acetate (or a mixture of them) is used at the equivalent (under aqueous conditions) of pH less than 3.5, and preferably pH 2 to 3, provided by the presence of sufficient of a suitable acid. The acidity can be provided by the addition of a suitable strong acid; the amount of this necessary can be determined by testing the quantity of acid needed to give the required pH when a sample of the acylated phosphatide composition is dispersed in water at 1% by weight concentration, such concentration being exclusive of any solvent that is present. Particularly suitable acids are those of $pK_a$ less than 3, and especially less than 2.5: they are preferably inorganic acids, especially hydrochloric, sulphuric, phosphorous, and orthophosphoric acids, whose $pK_a$'s are —3, 1.9, 2.0 and 2.1, respectively. Strong organic acids such as tartaric acid, $pK_a$ 3.0, and trichloroacetic acid, $pK_a$ 0.7, can also be used. Where the product is to be used in food, the acid will of course be an edible one. The acid can be introduced into the phosphatide mixture before the extraction, or into the solvent used for the extraction.

The fractionation step can be carried out using the standard procedure of acetone extraction for determination of acetone-insoluble matter in phosphatides described in the American Oil Chemists' Society Official Method Ja 4–46. The acetone extraction removes acylcephalin and any triglyceride oil present, leaving the lecithin-rich fraction as residue. It is preferable to dilute the acylated phosphatide mixture with a small amount of acetone to give a homogeneous mixture and to add this slowly to the bulk of acetone in order to achieve the most rapid extraction. The material to be fractionated can be extracted several times with acetone. Where there is more than one extraction, it is the initial condition of acidity that governs the efficiency of the extraction. Methyl acetate can be used similarly. Extraction is preferably carried out at room temperature.

Although a total separation of acylcephalin and lecithin may not be achieved in any particular case, a much more complete fractionation is effected than when attempts are made to separate the components with acetone under neutral conditions. The residues from extraction contain very little acylcephalin and are obtained as straw-coloured solids which on grinding form free-flowing powders that are readily dispersible in water or triglyceride oils. They are particularly valuable as emulsifiers and dispersing agent. The acylcephalin produced can be recovered from the acetone extracts after removal of acetone by suitable methods, for instance evaporation: the acylcephalins can also be used as emulsifier. Where the amount of residual acid in a product from the extraction is undesirably high it can be neutralised. An acylcephalin can be reconverted to cephalin where the acyl group is of such a nature that it can be removed without destruction of the cephalin: thus if acylation is effected with phthalic anhydride, the resulting o-carboxybenzoylcephalin can be cyclised by heating or the action of acetic anhydride to give phthaloylcephalin and cephalin liberated from this by heating with hydrazine.

Those products of the process of the invention that contain both lecithin and inositol phosphatides can be further fractionated with alcohol to provide alcohol-soluble fractions enriched in lecithin and alcohol-insoluble fractions enriched in inositol phosphatides.

The invention is illustrated by the following examples, in which all temperatures are in ° C., pressures are in mm. of mercury, the acetone used contained about 1% of water by weight, and acetone-insolubles were determined by the A.O.C.S. method referred to above. TLC is thin layer chromatography.

EXAMPLE 1

A commercial unbleached Canadian soya phosphatide of average grade having the following approximate composition was used as starting material.

| | Parts by weight |
|---|---|
| Triglycerides | 40 |
| Total acetone-insolubles | 60 |
| Lecithin | 15 |
| Cephalin | 12 |
| Inosital phosphatides | 23 |
| Sugars, steroids and salts | 10 |
| Water | 1 |
| Total phosphorus content | 2.2 |

This phosphatide (100 g.) and acetic anhydrate (4 g.) were stirred together vigorously at 80° (bath temperature) for 2 hours under 25 mm. pressure maintained through a trap of potassium hydroxide pellets. The cooled acylated mixture was stirred with acetone (50 ml.) containing orthophosphoric acid (88%, 2.5 g.) and the mixture obtained, which had an acidity corresponding to pH 2.95 in an aqueous solution containing 1% by weight of the mixture exclusive of the acetone, was allowed to drip slowly during 1 hour into acetone (1 litre) with vigorous stirring, which was maintained for a further half hour. The acetone, containing N-acetylcephalin and triglycerides, was decanted off and further acetone (1 litre) added and the mixture stirred for half an hour, and this decantation and solvent extraction step repeated. The residue was filtered off, washed with acetone (150 ml.), and residual solvent removed under reduced pressure at 25 mm. and 40° for one hour.

The product (39.2 g.) was a pale cream solid which contained 28% by weight of lecithin and 50% of inositol phosphatides, and showed (TLC) only traces of N-acetylcephalin and cephalin.

EXAMPLE 2

The process of Example 1 as repeated with substitution of the orthophosphoric acid by concentrated hydrochloric acid (35%, 1.0 g.) giving an initial extraction mixture with an acidity equivalent to pH 2.9 under aqueous conditions. The final residue (40 g.) contained only traces of N-acetylcephalin and cephalin (TLC).

EXAMPLE 3

Example 2 was repeated, but using 3.0 g. 35% hydrochloric acid, with a mixture having an acidity corresponding to pH 2.3. The product (36 g.) contained no N-acetylcephalin or cephalin.

EXAMPLE 4

Example 1 was repeated using, instead of the commercial Canadian soya phosphatide, a commercial alcohol-insoluble fraction prepared from soya phosphatide by extracting 1 part by weight of phosphatide with 3.5 parts of aqueous 90% ethanol at room temperature for a few minutes, decanting off the ethanol and taking the residue, which had the following approximate composition.

| | Parts by weight |
|---|---|
| Triglycerides | 41 |
| Total acetone-insolubles | 59 |
| Lecithin | 12 |
| Cephalin | 12 |
| Inositol phosphatides | 29 |
| Sugar, steroids and salts | 6 |
| Water | 1 |

The same amounts of materials were used as in Example 1, except that 6 g. acetic anhydride and 3.75 g. orthophosphoric acid (88%) were employed, providing an acidity equivalent to pH 2.8 under aqueous conditions.

From the phosphatide starting material (100 g.) there was obtained a pale cream solid product (35.4 g.) containing lecithin and inositol phosphatides and only traces of cephalin and N-acetylcephalin.

EXAMPLE 5

A commercial rapeseed phosphatide having the following approximate composition was used as starting material.

| | Parts by weight |
|---|---|
| Triglycerides | 30 |
| Total acetone-insolubles | 70 |
| Lecithin | 14 |
| Cephalin | 7 |
| Inositol phosphatides | 32 |
| Sugars, steroids and salts | 17 |
| Water | <1 |

The phosphatide mixture (100 g.) was stirred with acetic anhydride (3 g.) and heated at 80° for 2 hours under 25 mm. pressure maintained through a trap of potassium hydroxide pellets. Into a portion of the cooled product (20 g.) was mixed concentrated hydrochloric acid (35%, 1.0 g.) and the mixture extracted with acetone as in Example 1. The initial extraction mixture had an acidity equivalent to pH 2.7 under aqueous conditions.

The residual composition (8.6 g.) contained lecithin, inositol phosphatides, and only traces of cephalin and N-acetylcephalin (TLC).

EXAMPLE 6

A commercial unbleached soya phosphatide having the following approximate composition was used.

| | Parts by weight |
|---|---|
| Triglycerides | 35 |
| Total acetone-insolubles | 65 |
| Lecithin | 15 |
| Cephalin | 15 |
| Inositol phosphatides | 23 |
| Sugars, steroids and salt | 12 |
| Water | 1 |

This phosphatide (250 g.) and acetic anhydride (13.5 g.) were mixed intimately and heated at 80° for 2 hours under 25 mm. pressure maintained through a trap of potassium hydroxide pellets. The reaction mixture was allowed to cool to room temperature.

A portion of the acetylated mixture (25 g.) was stirred with acetone (10 ml.) containing trichloroacetic acid (1.25 g.) and the mixture (acidity equivalent to pH less than 3.5) was allowed to drip slowly into acetone (250 ml.) while stirring vigorously. After the addition the stirring was continued for half an hour, the mixture then allowed to settle for 10 minutes and the acetone decanted off. More acetone (250 ml.) was added and the mixture stirred vigorously for half an hour. The mixture was allowed to settle for 10 minutes and the acetone again decanted off. Fresh acetone (250 ml.) was added and the mixture again stirred. It was now filtered and the residue washed with acetone (50 ml.) and solvent removed at 40° under 25 mm. pressure for one hour. The product (10.5 g.) contained lecithin and inositol phosphatides, but no cephalin and only a very small amount of N-acetylcephalin (TLC).

EXAMPLE 7

Another portion of the acetylated phosphatide reaction mixture of Example 6 (25 g.) was stirred with acetone (12 ml.) and the resulting solution allowed to drip slowly into acetone (350 ml.) containing 50% aqueous sulphuric acid (1.5 g.). The resulting mixture had an acidity equivalent to pH 2.45 under aqueous conditions at a 1% concentration exclusive of the solvent. The extraction procedure of Example 6 was followed except that the further quantities of acetone were 250, 125 and 50 ml. respectively. The product (10 g.) contained only traces of N-acetylcephalin and cephalin.

What is claimed is:

1. A process for separating an N-acylcephalin and a phosphatide without an acylatable amino group from a mixture comprising them which comprises adding to the mixture a sufficient amount of an acid to provide the equivalent of pH less than 3.5 under aqueous conditions, extracting the mixture with acetone or methyl acetate, and separating the phases containing the N-acylcephalin and the phosphatide without an acylatable amino group.

2. A process for the treatment of phosphatides, which comprises contacting a phosphatide mixture that comprises cephalin [ as ] *and* a non-N-acylatable phosphatide with an acylating agent to convert the cephalin to N-acylcephalin, adding to *the* reaction mixture a sufficient amount of an acid to provide the equivalent of pH less than 3.5 under aqueous conditions, extracting the mixture with acetone or methyl acetate, and separating the phases containing the [ N-acylphosphatide ] *N-acylcephalin* and the [ N-acylcephalin ] *non-N-acylatable* phosphatide.

3. A process according to claim 2, wherein the phosphatide mixture comprises cephalin and lecithin.

4. A process according to claim 3, wherein the phosphatide mixture contains from 0.1 to 20 parts of lecithin to each part by weight of cephalin.

5. A process according to claim 3, wherein the acylating agent is a fatty acid anhydride.

6. A process according to claim 5, wherein the acid anhydride is acetic anhydride.

7. A process according to claim 5, wherein the completion of acylation is promoted by removal from the reaction mixture of the free fatty acid formed.

8. A process according to claim 7, wherein free fatty acid formed is removed by distillation.

9. A process according to claim 8, wherein the acid is removed by evaporation under reduced pressure.

10. A process according to claim 1, wherein the extraction solvent is acetone.

11. A process according to claim 1, wherein the reaction mixture containing N-acylcephalin is made acid to the equivalent of pH from 2 to 3 under aqueous conditions.

12. A process according to claim 11, wherein the acid pH is provided by an acid of $pK_a$ less than 2.5.

13. A process according to claim 1, wherein the acid pH is provided by hydrochloric acid.

14. A process according to claim 1, wherein the acid pH is provided by orthophosphoric acid.

* * * * *